(12) United States Patent
Psiuk et al.

(10) Patent No.: US 11,268,801 B2
(45) Date of Patent: Mar. 8, 2022

(54) METHOD AND DEVICE FOR DETERMINING A POSITION OF A MOVABLE OBJECT AND SYSTEM COMPRISING THE DEVICE

(71) Applicant: FRAUNHOFER-GESELLSCHAFT ZUR FOERDERUNG DER ANGEWANDTEN FORSCHUNG E.V., Munich (DE)

(72) Inventors: Rafael Psiuk, Erlangen (DE); Markus Hartmann, Sulzbach-Rosenberg (DE); Tobias Draeger, Baiersdorf (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 252 days.

(21) Appl. No.: 16/344,399

(22) PCT Filed: Aug. 29, 2017

(86) PCT No.: PCT/EP2017/071673
§ 371 (c)(1),
(2) Date: Apr. 24, 2019

(87) PCT Pub. No.: WO2018/077513
PCT Pub. Date: May 3, 2018

(65) Prior Publication Data
US 2020/0049479 A1     Feb. 13, 2020

(30) Foreign Application Priority Data
Oct. 24, 2016    (DE) ........................ 102016120250.9

(51) Int. Cl.
*G01B 7/14*     (2006.01)
*G01B 7/00*     (2006.01)

(52) U.S. Cl.
CPC .................................. *G01B 7/003* (2013.01)

(58) Field of Classification Search
CPC ........ G01D 5/145; G01D 5/147; G01D 5/202; G01D 5/206; G01D 5/225; G01D 5/2208;
(Continued)

(56) References Cited

U.S. PATENT DOCUMENTS

| 6,316,934 B1 | 11/2001 | Amorai-Moriya et al. |
| 6,789,043 B1 | 9/2004 | Nelson et al. |

(Continued)

FOREIGN PATENT DOCUMENTS

| CN | 105222772 A | 1/2016 |
| DE | 102013214283 A1 | 1/2015 |

(Continued)

*Primary Examiner* — Thang X Le
(74) *Attorney, Agent, or Firm* — 2SPL Patent Attorneys PartG mbB (57) ABSTRACT

A method for determining a position of a movable object is disclosed. The method comprises generating an electromagnetic exciter field. The electromagnetic exciter field is configured to excite the movable object to develop a magnetic response field. Further, the method includes determining a plurality of measurement values for the magnetic response field by measuring the magnetic response field at a plurality of predetermined measuring positions. Further, the method includes determining the position of the movable object based on a comparison of the plurality of measurement values with reference measurement values. Here, one position of the movable object is allocated to each of the reference measurement values. Further, the reference measurement values are each determined by a simulation.

21 Claims, 2 Drawing Sheets

(58) Field of Classification Search
CPC .. G01D 5/12; G01D 5/14; G01D 5/16; G01D 5/2457; G01D 5/2013; G01D 5/2046
See application file for complete search history.

(56) References Cited

U.S. PATENT DOCUMENTS

| | | |
|---|---|---|
| 7,139,582 B2 | 11/2006 | Couronne et al. |
| 10,345,118 B2 * | 7/2019 | Yang ............... A63B 71/0622 |
| 2007/0299625 A1 * | 12/2007 | Englert ............... A63B 43/00 |
| | | 702/150 |
| 2008/0085790 A1 * | 4/2008 | Englert ............ A63B 71/0605 |
| | | 473/470 |
| 2008/0252015 A1 * | 10/2008 | Eskildsen ........... A63B 63/004 |
| | | 273/371 |
| 2010/0022904 A1 | 1/2010 | Centen |
| 2010/0271012 A1 | 10/2010 | Patterson et al. |
| 2014/0266164 A1 | 9/2014 | Arumugam et al. |
| 2016/0107028 A1 * | 4/2016 | Hartmann ............... H01Q 7/08 |
| | | 324/207.22 |

FOREIGN PATENT DOCUMENTS

| | | |
|---|---|---|
| EP | 2814114 A1 | 12/2014 |
| WO | 2008043443 A2 | 4/2008 |
| WO | 2013149649 A2 | 10/2013 |

* cited by examiner

METHOD AND DEVICE FOR DETERMINING A POSITION OF A MOVABLE OBJECT AND SYSTEM COMPRISING THE DEVICE

TECHNICAL FIELD

Embodiments relate to the determination of the position of movable objects. In particular, embodiments relate to a method for determining a position of a movable object, an apparatus for determining a position of a movable object and a system comprising the above apparatus.

BACKGROUND

In many fields of application it is required to know the position of a movable object and/or be able to determine the same.

In logistics it may be required, for example, to know and/or determine the location of access of a picker into a rack. Thus, it may be controlled whether the picker has taken goods from the correct rack shelf and/or into what rack shelf if has placed goods.

Determining a position of a movable object may also be required in the field of sports, e.g. to know and/or determine the position of a gaming device. For example, it may be required to determine whether a ball and/or a puck crossed a goal line or whether a player is in a certain area of the playing field (e.g. to detect a goalmouth offside in case of ice hockey).

Likewise, the position of a movable object may be required in generating virtual realities to detect a position, an orientation and/or a movement of a user in the real environment and consider same in the representation of the virtual reality.

It is thus the object to provide a possibility for determining a position of a movable object.

SUMMARY

Embodiments of a method for determining a position of a movable object solve this object. The method comprises generating an electromagnetic exciter field. The electromagnetic exciter field is configured to excite the movable object to develop a magnetic response field.

Further, the method includes determining a plurality of measurement values for the magnetic response field by measuring the magnetic response field at a plurality of predetermined measuring positions. Further, the method includes determining the position of the movable object based on a comparison of the plurality of measurement values with reference measurement values. Here, one position of the movable object is allocated to each of the reference measurement values. Further, the reference measurement values are each determined by a simulation.

Further embodiments relate to an apparatus for determining a position of a movable object. The apparatus here includes an exciter module configured to generate an electromagnetic exciter field. The electromagnetic exciter field is configured to excite the movable object to develop a magnetic response field. Further, the apparatus includes a measurement module configured to determine a plurality of measurement values for the magnetic response field by measuring the magnetic response field at a plurality of predetermined measuring positions. The apparatus further includes an evaluation module configured to determine the position of the movable object based on a comparison of the plurality of measurement values with reference measurement values. Here, one position of the movable object is allocated to each of the reference measurement values. Further, the reference measurement values are each determined by a simulation.

Additionally, further embodiments relate to a system at least comprising a movable object and above-mentioned apparatus for determining a position of a movable object. The movable object is configured here to develop a magnetic response field as a reaction to an electromagnetic exciter field.

BRIEF DESCRIPTION OF THE FIGURES

Embodiments are explained in more detail with reference to the accompanying Figures, in which.

DESCRIPTION

Various embodiments will now be described with reference to the accompanying drawings in which some example embodiments are illustrated. In the Figures, the thicknesses of lines, layers and/or regions may be exaggerated for clarity.

Like numbers refer to like or similar components throughout the following description of the included figures, which merely show some exemplary embodiments. Moreover, summarizing reference signs will be used for components and objects which occur several times in one embodiment or in one Figure but are described at the same time with respect to one or several features. Components and objects described with like or summarizing reference signs may be implemented alike or also differently, if applicable, with respect to one or more or all the features, e.g. their dimensioning, unless explicitly or implicitly stated otherwise in the description.

Although embodiments may be modified and changed in different ways, embodiments are illustrated as examples in the Figures and are described herein in detail. It is to be noted, however, that it is not intended to restrict embodiments to the respectively disclosed forms but that embodiments rather ought to c any functional and/or structural modifications, equivalents and alternatives which are within the scope of the invention. Same reference numerals designate same or similar elements throughout the complete description of the figures.

It is noted, that an element which is referred to a being "connected" or "coupled" to another element, may be directly connected or coupled to the other element or that intervening elements may be present.

The terminology used herein only serves for the description of specific embodiments and should not limit the embodiments. As used herein, the singular form such as "a," "an" and "the" also include the plural forms, as long as the context does not indicate otherwise. It will be further understood that the terms e.g. "comprises," "comprising," "includes" and/or "including," as used herein, specify the presence of the stated features, integers, steps, operations, elements and/or components, but do not preclude the presence or addition of one and/or more other features, integers, steps, operations, elements, components and/or any group thereof.

Unless otherwise defined, all terms (including technical and scientific terms) are used herein in their ordinary meaning of the art to which the examples belong and given to same by a person of ordinary skill in the art. It is further clarified that terms like e.g. those defined in generally used dictionaries are to be interpreted to have the meaning consistent with the meaning in the context of relevant technology, as long as it is not expressly defined otherwise herein.

Figure 1:
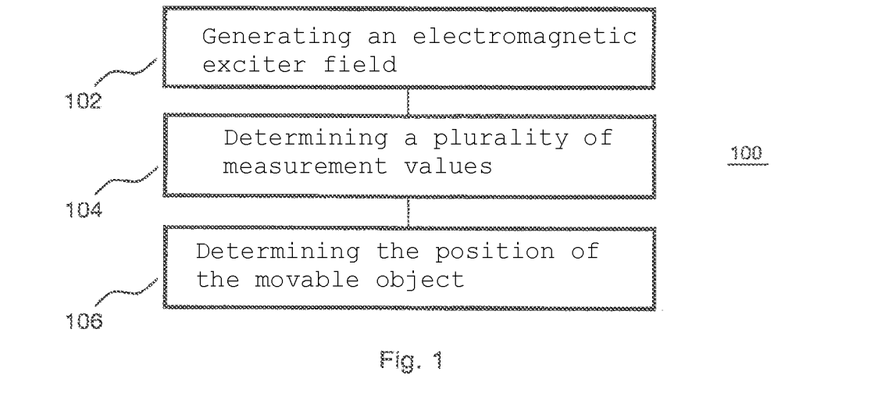
FIG. 1 shows a flow chart of an embodiment of a method for determining a position of a movable object.

FIG. 1 shows a method 100 for determining a position of a movable object. The method 100 comprises generating 102 an electromagnetic exciter field. The electromagnetic exciter field is configured to excite the movable object to develop a magnetic response field. Further, the method 100 includes determining 104 a plurality of measurement values for the magnetic response field by measuring the magnetic response field at a plurality of predetermined measuring positions. Further, the method 100 includes determining 106 the position of the movable object based on a comparison of the plurality of measurement values with reference measurement values. Here, one position of the movable object is allocated to each of the reference measurement values. Further, the reference measurement values are each determined by a simulation.

The method 100 may enable a localization of the movable object in real time. Based on the determination of the reference measurement values by a simulation, both a time requirement and also a complexity for generating the reference measurement values may be reduced. In particular, a reaction to changes in the environment and/or the movable object is possible fast and with little effort by updating the reference measurement values by means of an adapted simulation. Complex measurements for determining the reference measurement values may be avoided.

The movable object may be any movable object which may move in space and/or develop and/or generate a magnetic response field in reaction to an electromagnetic exciter field. For example, the movable object may be and/or include a coil and/or a coil system. The movable object may, for example, be a piece of clothing (e.g. shoe, jacket, trousers, shirt, glove, head cover), a piece of accessory (e.g. necklace, bracelet, belt, glasses), a gaming device (e.g. ball, puck, bowl, football) or sports equipment (e.g. helmet, glove, trainers, racket, protective equipment), including a component (element, device) which may develop and/or generate a magnetic response field in reaction to an electromagnetic exciter field. For example, the movable object may be a wristband, a ball, a puck, a glove, a shoe or a trainer including a coil and/or a coil system.

The electromagnetic exciter field may be any electromagnetic field which may excite the movable object to develop a magnetic response field. For example, the electromagnetic exciter field may be an alternating magnetic field. An alternating magnetic field may for example be generated by means of coils or conductor loops through which AC current flows. The electromagnetic exciter field may here include one or several frequency components. Further, a frequency of the electromagnetic exciter field may vary.

The plurality of measurement values for the magnetic response field is represented by states of the magnetic response field at the plurality of predetermined measuring positions. For example, the plurality of measurement values may indicate the respective strength of the response field at the plurality of predetermined measurement positions. The plurality of predetermined measurement points include two or more known measurement points for the magnetic response field. Based on a desired dimension or a desired accuracy of the position of the movable object to be determined, the number of measurement points may be selected. For example, the magnetic response field may be measured at two, three, four, five or more different positions. In order to measure the magnetic response field, e.g. one or several receive antennae may be arranged at one measurement position. A voltage induced in the receive antenna is here proportional to the local strength of the magnetic response field at the measurement position.

The comparison of the plurality of measurement values with reference measurement values may e.g. be done by a comparison of the measurement values with reference measurement values stored in a table. In this respect, e.g. a similarity or match between a measurement value and the reference measurement values may be determined. Based on the comparison results, for example, the position of the movable object allocated to a reference value may be determined to be the position of the movable object, or a combination of several positions of the movable object allocated to the reference measurement values may be determined to be the position of the movable object. A reference value and its allocated position of the movable object may e.g. be stored as a tuple of two in a table. Accordingly, the comparison of the plurality of measurement values to reference measurement values may e.g. include searching a table.

As the reference measurement values are each determined by a simulation, both a time requirement and also a complexity for generating the reference measurement values may be reduced. Complex measurements for determining the reference measurement values may be avoided. Likewise, updated reference values may be generated by adapting the simulation and/or simulation parameters.

In some embodiments, further an orientation of the movable object may be allocated to each of the reference measurement values. This may facilitate to determine an orientation of the movable object in addition to the position of the movable object. The position of the movable object in space may thus be determined more accurately. By using a simulation, the determination of the reference measurement values may be substantially simplified as changes of the orientation of the object only require an adaptation of the simulation parameters. Complex measurements for determining the reference measurement values for different orientations may thus be avoided.

For example, in some embodiments, one of the reference measurement values may be determined by the simulation based on a geometry of an exciter system used for generating the electromagnetic exciter field, and/or a geometry of a response system used for emitting the magnetic response field, and/or a geometry of a measurement system used for measuring the magnetic response field and/or an impedance of the response system. The geometries (setups, structures) of the exciter system, the response system and the measurement system and also the impedance of the response system fundamentally determine the characteristics of the magnetic response field at the plurality of measurement points. Knowing the above-mentioned parameters may thus enable an exact and/or detailed simulation of the magnetic response field. Accordingly, realistic reference measurement values may be generated for the position determination of the movable object.

The basis for the comparison may e.g. be formed by a fingerprint table with the reference measurement values. The reference measurement values here form the characteristic "fingerprint" of the movable object at a certain position and/or in a certain orientation in space. The basis for a fingerprint-based localization may thus be a table that allocates measurable characteristics to each position and/or orientation. This table is generated in advance. In case of the technology presented here the table may for example contain the three-dimensional position of a coil system in space and optionally its orientation. The allocated field strengths of the secondary field (i.e. the magnetic response field) measured in the receive antennas (forming the measurement system) may e.g. be associated with this position and orientation tuple. Traditionally, fingerprint tables are measured in. In this respect, however, time consuming and complex measurement actions are necessary which have to be executed again for every changing configuration of the system. The advantage of the method presented here is the simulative generation of the fingerprint table. Here, for a known configuration of the exciter coil of the primary field (i.e. for the exciter system of the electromagnetic exciter field), of the coil system (i.e. the response system) and the receive antennas (i.e. the measurement system) only its configuration parameters may be entered in a simulation software and the simulation software automatically generates a fingerprint table. The parameters are, for example, the geometric shapes of the exciter (i.e. for the exciter system), the coils and the receive antennas. Additionally, the impedance of the coil may be considered for the simulation.

Calculation of the primary field (i.e. the electromagnetic exciter field) may, for example, be executed via the magnetic vector potential $\vec{A}(P)$ in place P according to the following formulae (1) and (2):

$$\vec{A}_i(\vec{r_P}) = \frac{\mu_0 I}{4\pi} \cdot (\vec{q_{i+1}} - \vec{q_i}) \int_0^1 \frac{1}{r(\vec{x_i}(t))} dt \quad (1)$$

$$\vec{A}(P) = N \cdot \sum_{i=0}^{n} \vec{A}_i(P) \quad (2)$$

Figure 2A:
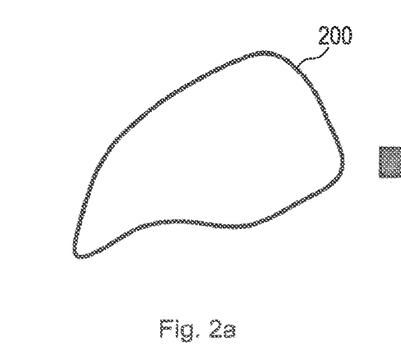
FIGS. 2a and 2b show an embodiment of an approximation of a conductor loop.
Figure 2B:
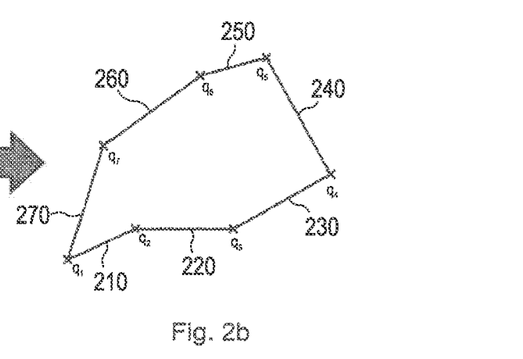

As represented in FIGS. 2a and 2b, e.g. any current-carrying conductor loop 200 (serving as an exciter and/or exciter system) may be divided into any number of small straight conductor pieces 210, 220, 230, 240, 250, 260, 270 to thus approximate randomly shaped conductors. Now, the formula (1) may be applied to every single conductor piece 210, 220, 230, 240, 250, 260, 270. The sum of the individual amounts then, according to formula (2), results in the overall magnetic vector potential $\vec{A}(P)$ in place P.

In order to now be able to calculate the voltage on the basis of a primary alternating field (i.e. the electromagnetic exciter field) in a randomly shaped, randomly oriented and randomly positioned coil in space, the magnetic vector potential calculated according to formula (2) may be integrated according to the following formula (3) via the contour of the coil:

$$U_{ind} = -N \cdot 2\pi f \cdot \oint_{\partial F} \vec{A} \cdot d\vec{s} \quad (3)$$

Also here, if required, approximations of the coil by straight conductor pieces may be used. N here represents the number of windings of the coil and f the frequency of the alternating field (i.e. the electromagnetic exciter field).

According to the following formula (4), via the impedance Z of the coil also the current I through the coil may be calculated:

$$I = \frac{U_{ind}}{Z} \quad (4)$$

To calculate the magnetic vector potential of the coil field (i.e. the magnetic response field) and therefrom the voltages induced in the receive antennas, analog methods may be used.

When calculating the generated vector fields and the induced voltages, in case of mathematically closed, writable geometries like ellipses for exciters, coils or antennas, also analytic formulas may be used. These may be rotated into the correct orientation by means of vector field transformations like quaternions or rotation matrices.

The thus calculated induced voltages in the receive antennas are allocated to the allocated positions and/or orientations of the coil system in the fingerprint table. This table is used for the localization. The position and/or orientation grid of the simulated points may depend on the application.

In the localization, then, for example, the field currently measured with the receive antennas is measured at different predetermined positions in space (receive antenna positions, i.e. the plurality of predetermined measuring positions) and compared to entries in the fingerprint table.

According to some embodiments, determining 106 the position of the movable object may for example comprise determining a similarity of one of the plurality of measurement values to one of the reference measurement values according to a predetermined metric. The similarity here indicates, in how far a measurement value corresponds to one of the reference measurement values. E.g. the Euclidian metric may be used as a metric. Alternatively, also other metrics may be used for the comparison. If, for example, the distribution of errors in the measurement signal is known (e.g. a gaussian distribution), a gaussian distribution may be used as a (distance) metric which may provide better results.

Accordingly, in some embodiments, determining 106 the position of the movable object may further comprise determining the one position of the movable object allocated to a reference value as the position of the movable object, whose reference value has a greatest similarity to the plurality of measurement values according to the metric. In other words: The position of the movable object allocated to the most similar reference measurement value may be determined to be the position of the movable object.

If e.g. the Euclidian distance is used as a metric, the position of the movable object may be determined according to the following formula (5):

$$\mathrm{argmin} \Sigma_{i=1}^{a}(U_{sim,i} - U_{mess,i})^2 \quad (5),$$

wherein a is the number of used measurement antennas, $U_{mess,i}$ indicates the measured voltage in the antenna i and $U_{sim,i}$ the simulated voltage for the antenna i in the table. According to formula (5) the entry in the table with the smallest Euclidian distance is determined (selected) to be the estimated position and/or orientation.

Alternatively, determining 106 the position of the movable object may in some embodiments further comprise determining a number of reference values which have a greatest similarity to the plurality of measurement values according to the metric. Further, determining 106 the position of the movable object may in some embodiments further comprise determining a weighted average value of the positions of the movable object allocated to the number of the reference values as the position of the movable object. In other words: Also a weighted average value may be determined from a number of entries in the table with the smallest distance to the measurement values.

In this respect, for example, a weighted k-nearest localization method may be used.

In the localization, not only the entry with the smallest Euclidian distance is output as an estimate, but a weighted average value is formed from the k entries with the smallest distance. The distance d may, for example, be determined according to the following formula (6):

$$d = \Sigma_{i=1}{}^a (U_{sim,i} - U_{mess,i})^2 \quad (6)$$

To the k most similar entries in the database, i.e. e.g. the entries with the smallest distance between the measured antenna voltages and the antenna voltages stored in the table, weightings $w_n$ e.g. according to the following formula (7) may be allocated:

$$w_n = \frac{d_k - d_n}{d_k - d_1}, \quad n = 1 \ldots k \quad (7)$$

$w_n$ represents the weight of the n-nearest table entry (i.e. the reference measurement value with the n-nearest similarity), $w_1$ represents the weight for the table entry with the smallest euclidian distance and $w_k$ represents the weight for the entry within the k entries with the greatest distance.

In some embodiments, a weighting of a position of the movable object allocated to one of the number of reference values may thus be based on the similarity of the one of the number of reference values to the plurality of measurement values.

The averaged, estimated position $\bar{x}$ may, for example, be determined according to the following formula (8):

$$\bar{x} = \frac{\sum_{n=1}^{k} x_n w_n}{\sum_{n=1}^{k} w_n} \quad (8)$$

There, $x_n$ indicates the estimated position in space of the object to be localized for the n-th entry within the k most similar entries.

Using this method, positions may be estimated which are not within the grid of the table. Thus, an interpolation effect may be achieved which increases the accuracy of the position estimate far beyond the grid of the table. Thus, the position grid in the simulation of the table may be selected coarser than e.g. in the above represented embodiments. Thus, an exact localization may be acquired without simulating a very fine grid at positions with many table entries. This may shorten a simulation period, reduce a memory occupancy of the table and shorten a search in the table in the actual localization. A real-time localization may therefore be enabled. A weighted k-nearest localization method may thus simultaneously enable an increase of the localization accuracy and a size reduction of the table.

Among others, the computing time in localization may be reduced substantially as a smaller table has to be searched. Making the grid coarser causes a cubic decrease of the size of the table. Thus, the time duration of the search within the table may be reduced cubically in the localization process which may enable a real-time localization and at the same time has the advantage of the increased localization accuracy. The weighting may here classically be linear—depending on the distance metric. If a non-linear distance metric is used or if the measurement values are non-linear, also here a non-linear weighting may be advantageous. This may improve localization.

Due to interferences or noise processes, sporadically also erroneous position values may be estimated. Due to such erroneous estimates the position of the object may not be estimated in a stable way and jump to and fro between far apart positions. In some embodiments, determining 106 the position of the movable object thus further includes filtering a candidate for the position of the movable object using a Kalman filter. The Kalman filter is here based on a movement model for the movable object. The movement model describes a conventional (common) movement of the movable object. The Kalman filter may enable removing the interferences.

Filtering the candidate for the position of the movable object may in some embodiments e.g. include determining, using the movement model, a predicted position of the movable object based on previously determined positions of the movable object. Further, filtering the candidate for the position of the movable object may include comparing the predicted position of the movable object to the candidate for the position of the movable object.

Filtering the candidate for the position of the movable object may further include, for example, discarding the candidate for the position of the movable object if a difference between the predicted position of the movable object and the candidate for the position of the movable object is greater than a threshold value.

In other words: A (standard) Kalman filter may be used which is based on a movement model. In this filter, due to position estimates from the past, e.g. a position and speed have to be calculated. Based on these values a prediction for the position may be predicted in the next time step and be filtered with the subsequent position estimate based on the new measurement values. This Kalman filtering with a movement model may have the consequence that non plausible leaps in position estimation are regarded as measurement errors from one time step to the next and are thus not introduced into the position estimate. The stability of the position estimate may by increased by this method.

Alternatively, for discarding the candidate for the position of the movable object the same may be given less trust if a difference to the predicted position of the movable object is big (e.g. bigger than a threshold value). For example, a weighting of the predicted position and a weighting of the position based on measurement data (i.e. the candidate for the position of the movable object) may be executed and this weighted position may be used. Also this approach may increase a stability of the position estimate.

In some embodiments, the magnetic response field may, for example, be generated by three coils orthogonal to each other. The three coils may here e.g. be configured to substantially generate equal magnetic partial response fields with an identical orientation relative to the electromagnetic exciter field. I.e., the first coil generates a first magnetic partial response field, the second coil generates a second magnetic partial response field, while the third coil generates a third magnetic partial response field. The first, the second and the third magnetic partial response field may here both be identical and also substantially identical, i.e. only deviate little regarding their characteristics.

With a coil system to be localized consisting of three coils behaving electrically similar and being orthogonal to one another, the direction and amplitude of the secondary field (i.e. the magnetic response field) of this coils system only changes marginally with the orientation of the coil system. Each of these three individual coils per se, e.g. by the combination of their characteristics (number of windings, shape and impedance) in case of the same orientation at the same position in the primary field (i.e. the electromagnetic exciter field) may provide a secondary field shaped geometrically similar and of similar strength (magnetic partial response field) in a similar phase position. This similar reaction to the primary field may enable forming a secondary field (magnetic response field) independent of the rotation. In summary, these orthogonally assembled coils behave like one single coil perpendicular to the primary field. Such a coil system may be advantageous as only the position but not the orientation of such a coil system has to be stored in the table. This may drastically facilitate the search for the right position as the table may require less entries by the factor $N_{alpha}*N_{beta}*N_{gamma}$. This may reduce the memory requirement of the table and enable a real-time search of the position in the table.

It may further be interesting to determine an orientation of the movable object in space. In some embodiments, the magnetic response field may be generated by three coils which are orthogonal to one another. The three coils may here be configured to substantially generate differentiable magnetic partial response fields with an identical orientation relative to the electromagnetic exciter field. I.e., the first coil generates a first magnetic partial response field, the second coil generates a second magnetic partial response field, while the third coil generates a third magnetic partial response field. The first, the second and the third magnetic partial response field here substantially deviate regarding their characteristics. For example, the three coils may comprise different resonance frequencies. Alternatively or additionally, the respective magnetic partial response fields of the three coils may also be modulated with different code sequences.

To determine the orientation of a coil system, the coil system may for example have three orthogonally set up coils whose secondary fields may be differentiated. This may, for example, be achieved by tuning each of the three coils to a different resonance frequency. There are other possibilities, however, like the modulation of an own code sequence to each of the three coils. Apart from that, the three coils may also be caused to react sequentially one after the other to the primary field (i.e. the electromagnetic exciter field). Thus, a temporal separation of the signals would have been caused. The coils do not have to have the same shape or the same number of windings. Due to a scaling factor for each frequency and/or each coil the signals of the three coils may be settled so that each coil provides the same (scaled) signal when at the same position with the same orientation. The signals may now be used to determine the 3D position of the coil system using the above described method. As the position is known now, the orientation of each coil may be estimated individually at this position. This may also be done using a fingerprint table. The use of the above described position estimate may further facilitate to eliminate ambiguities occurring in the simultaneous position and orientation estimate. By estimating several coils then a plausibility decision may be taken as to which of the possible position/orientation combinations may be considered. Alternatively, this ambiguity may be counteracted using a Kalman filter having a motion/rotation model.

If parameters like the exciter current (i.e. the current used for generating the electromagnetic exciter field) or the impedance of a response system, like for example a coil and/or a coil system change dynamically, the measured antenna signals (i.e. the plurality of measurement values) may deviate from the theoretic values in the table (i.e. the reference measurement values). In this case, however, the interference would have an equal effect on all antenna signals. Thus, determining 104 the plurality of measurement values for the magnetic response field may include normalizing the measurement value determined for one of the plurality of predetermined measurement positions based on the sum of the measurement values determined for all of the plurality of predetermined measurement positions.

It may thus be advantageous to compare a standardized value of the measured and simulated antenna signals. In this respect, e.g. each of the measured antenna voltages $U_{mess,i}$ may be normalized with the sum of measured voltages of all measurement antennas according to the following formula (9):

$$U_{mess,i,norm} = \frac{U_{mess,i}}{\sum_{i=1}^{a} U_{mess,i}} \quad (9)$$

Thus, for each of the a antennas a normalized measurement value may be determined.

The voltages stored in the table may also be settled according to formula (9). I.e., the method 100 may further include normalizing one of the reference values based on the sum of the measurement values determined for all of the plurality of predetermined measurement positions.

It may be advantageous in case of such a normalization that the antenna signal of each individual receive antenna is a percentage of the overall voltage measured by all receive antennas. If suddenly, due to an interference, the current in the exciter of the coil system changes, the absolute values of the receive voltages change but not the percentages (normalized values). The absolute values measured would no more correspond to the absolute entries in the table. If the table is normalized according to formula (9), however, an allocation of the measured normalized antenna voltages to the simulated normalized voltages may be possible.

By the normalization depth information is lost, however. That is to say that the distance of the coil system (or another movable object) from the exciter level in which e.g. also the receive antennas may be arranged may not be determined any more. Accordingly, only in the exciter level an exact position estimate would be possible. This deficiency may be counteracted with a shift of the receive antennas outside the exciter level. The plurality of predetermined measurement positions may thus in some embodiments be located out of a plane in which generating the electromagnetic exciter field takes place.

If further (e.g. large) objects are located in the localization environment, the same may distort the primary field (i.e. the electromagnetic exciter field) so that the simulated table (i.e. the reference measurement values) does not reflect the real environment any more. Thus, the localization accuracy in the environment of this interference object may be reduced.

Thus, the method 100 may further include determining that the movable object is not located within a predetermined radius around a location of generation of the electromagnetic exciter field. Determining is here based on a frequency sweep of the electromagnetic exciter field. Further, the method 100 may include determining a plurality of auxiliary measurement values at the plurality of predetermined measurement positions. The plurality of auxiliary measurement values here represents a magnetic response field of an interference object at the plurality of predetermined measuring positions. The method 100 may further include estimating a position of the interference object based on a comparison of the plurality of auxiliary measurement values with the reference measurement values (e.g. according to the above principles). Then, taking into account the interference object, method 100 may further include determining an updated reference measurement value for a position which has a predetermined maximum distance to the position of the interference object. This way, updated reference measurement values may be determined in the environment of the interference object which take into account the interference effects caused by the interference object. Accordingly, the position of a movable object may be determined accurately also in the presence of an interference object.

For example, first a frequency sweep may be done using the primary field frequency (i.e. the frequency of the electromagnetic exciter field) in order to check if a coil is nearby. If there is no coil nearby, based on the currently measured antenna voltages the position of an interference object may be coarsely estimated. Subsequently, the table may be simulated again dynamically in the environment of the interference object. For example, now the interference object is simulated as a coil with the known, measured phase position. The amplitude of this secondary interference field may also be estimated. In the simulation now a voltage based on the primary field of the exciter (i.e. the exciter system) and also based on the secondary field of the interference object is induced into the coil system to be localized (i.e. the movable object). Using this table which better maps reality, now an optimized localization may be executed close to the interferer. An influence of a large, field-distorting interference object may thus be reduced.

It may further be of interest to identify and localize several movable objects simultaneously (i.e. in parallel). In this respect, the method 100 may, for example, include determining a plurality of second measurement values at the plurality of predetermined measurement positions. The plurality of second measurement values here represents a second magnetic response field of a second movable object at the plurality of predetermined measuring positions. A first resonance frequency of a first response system of the movable object used for sending out the magnetic response field is here different from a second resonance frequency of a second response system of the second movable object used for sending out the second magnetic response field. Further, the method 100 may include determining the position of the second movable object based on a comparison of the plurality of second measurement values with the reference measurement values. By tuning the two movable objects to different resonance frequencies, the second measurement values for the second movable object may be differentiated from the measurement values for the (first) movable object and the position of the second movable object may be determined according to the above principles.

If two or more coil systems are simultaneously positioned in the primary field and the coil systems are tuned to the same frequency, the individual secondary fields of the coil systems in the receive antennas may not differentiated. The consequence is that neither the one coil nor the other may be localized.

As indicated above, this may be solved by tuning the respective coil systems to different resonance frequencies. In the receiver, this way the signals may be separated and be further processed for localization. Thus the simultaneous identification and localization of several coil systems may be facilitated by tuning the coils to different frequencies.

Alternatively, the method 100 for the simultaneous (i.e. parallel) identification and localization of several movable objects may further again include determining a plurality of second measurement values at the plurality of predetermined measurement positions. The plurality of second measurement values here again represents a second magnetic response field of a second movable object at the plurality of predetermined measuring positions. The magnetic response field and the second magnetic response field are here modulated with codes which are orthogonal to one another. Further, the method 100 may include determining the position of the second movable object based on a comparison of the plurality of second measurement values with the reference measurement values. By using orthogonal codes for the modulation the second measurement values for the second movable object may be differentiated from the measurement values for the (first) movable object and according to the above principles the position of the second movable object may be determined.

One further possibility for a simultaneous identification and localization of coil systems may thus be provided by a modulation of the secondary field of the coils (i.e. the magnetic response fields) each with orthogonal codes. Suitable code sequences may be all code sequences which are orthogonal to one another—i.e. have good cross-correlation characteristics—like e.g. M-sequences or gold-codes. In the receiver, the received signal of each antenna may be correlated with the known bit patterns. The respective height of the correlation peak in each antenna may then be directly proportional to the field strength in the antennas and be thus used as an indicator for the field strength. These correlation peaks may now, for example, after a suitable scaling, be used as a replacement for the voltages induced in the receive antennas. Thus, using the same a search within the fingerprint tables may be executed.

This may be advantageous as all coils may be tuned to the same frequency and for a certain bit length a plurality of orthogonal codes with good cross-correlation characteristics exist. Thus, simultaneously a plurality of different coils may be identified and localized. One further positive effect may be the code gain which may take the signals out from noise. Here, signals with a low signal amplitude with an increasing code length may be better detected. Thus, the simultaneous identification and localization of several coil systems may be facilitated by modulation.

The methods presented here may thus enable a relatively interference-resistant localization and/or orientation estimation of e.g. a passive coil system in real time with changing but known configurations of the system characteristics.

More details and aspects of the method 100 are described in the following in connection with one or more embodiments (e.g. FIG. 4 and FIG. 5). The method may include one or more optional features according to one or more of the above described embodiments.

Figure 3:
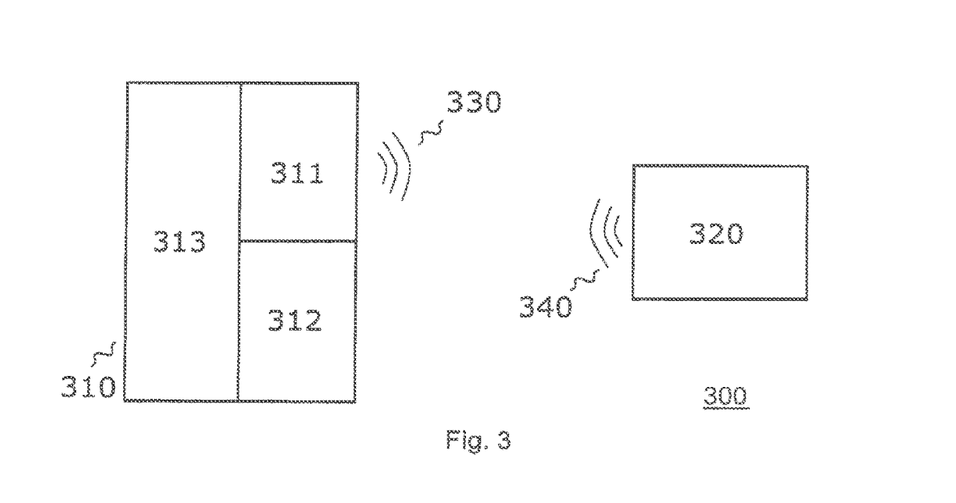
FIG. 3 shows an embodiment of a system with a movable object and an apparatus for determining a position of the movable object.

In the following, FIG. 3 shows a system 300 with a movable object 320 and an apparatus 310 for determining a position of the movable object. The movable object 320 is configured here to develop or generate a magnetic response field 340 as a reaction to an electromagnetic exciter field 330.

The apparatus 310 includes an exciter module 311 configured to generate an electromagnetic exciter field 330. The electromagnetic exciter field 330 is configured here to excite the movable object 320 to develop (generate) a magnetic response field 340.

Further, the apparatus 310 includes a measurement module 312 configured to determine a plurality of measurement values for the magnetic response field 340 by measuring the magnetic response field 340 at a plurality of predetermined measuring positions.

The apparatus 310 further includes an evaluation module 313 configured to determine the position of the movable object based on a comparison of the plurality of measurement values with reference measurement values. Here, one position of the movable object 320 is allocated to each of the reference measurement values. The reference measurement values are each determined by a simulation.

The apparatus 310 may enable a localization of the movable object 320 in real time. Based on the determination of the reference measurement values by a simulation, both a time requirement and also a complexity for generating the reference measurement values may be reduced. In particular, a reaction to changes in the environment and/or the movable object is possible fast and with little effort by updating the reference measurement values by means of an adapted simulation. Complex measurements for determining the reference measurement values may be avoided.

As indicated above, the movable object may be any object which may move in space and/or develop and/or generate a magnetic response field in reaction to an electromagnetic exciter field. For example, the movable object may be and/or include a coil and/or a coil system.

The exciter module 311 may here be configured to generate the electromagnetic exciter field 330 according to the above described principles and develop same in its environment. In particular, in this respect the exciter module 311 may include one or several coils, one or several conductor loops and/or one or more coil systems through which an electric current flows.

The measurement module 312 may here be configured to receive the magnetic response field 340 according to the above described principles and determine the measurement values for the magnetic response field 340. In particular, the measurement module 312 may include a plurality of receive antennas arranged at the plurality of predetermined measurement positions. Here, at one or several of the plurality of predetermined measurement positions both a single measurement antenna and also several measurement antennas may be arranged. The measurement module 312 may further include one or several suitable read-out electronic(s) to prepare the signals measured by the receive antennas for further processing by the evaluation module 313. For example, a read-out electronic may filter and/or digitize the measured signals.

The evaluation module 313 may here be configured to determine the position of the movable object 320 according to the above described principles from the plurality of measurement values and the reference measurement values. The evaluation module (or any other module) may for example comprise a processor, a Central Processing Unit (CPU), a Graphics Processing Unit (GPU), a computer, a computer system, an Application-Specific Integrated Circuit (ASIC), an Integrated Circuit (IC), a System on a Chip (SoC), a programmable logics element or a Field Programmable Gate Array (FPGA) comprising a microprocessor on which software for controlling the evaluation module 313 is run according to the above principles. Further, the evaluation module 313 may comprise one or several memories in which e.g. for controlling the evaluation module 313 the reference measurement values or other data may be stored.

Figure 4:
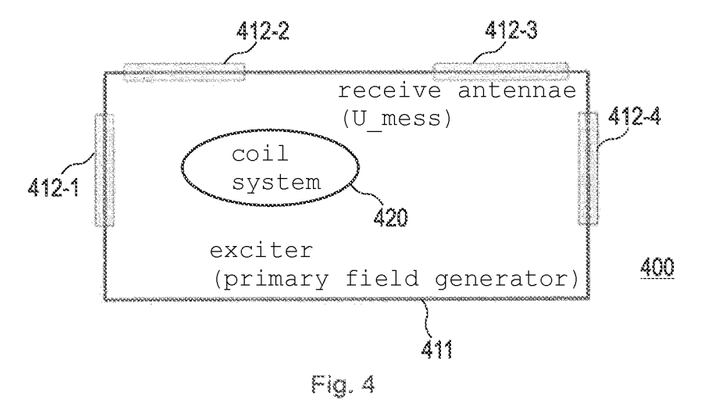
FIG. 4 shows a further embodiment of a system with a movable object and an apparatus for determining a position of the movable object from the field of logistics.
Figure 5:
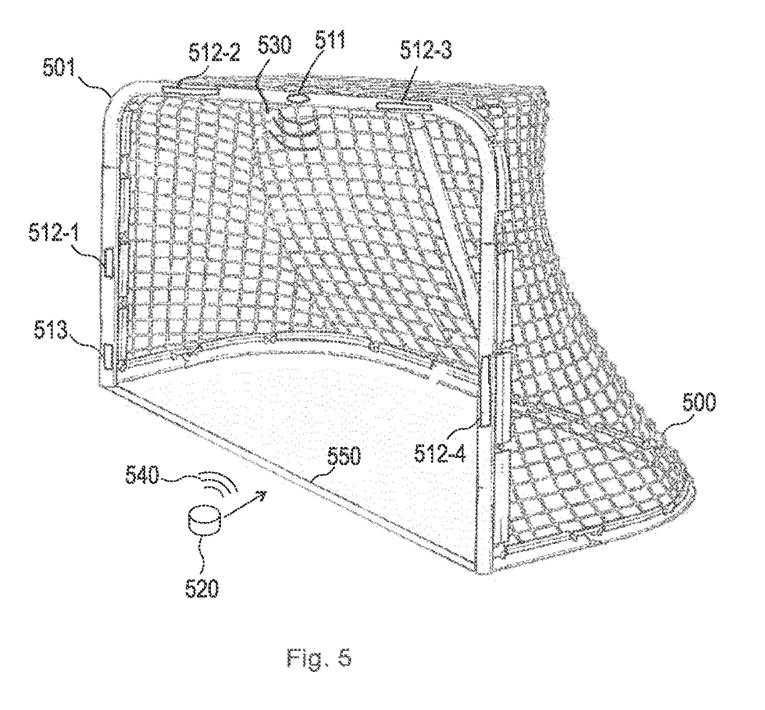
FIG. 5 shows another embodiment of a system with a movable object and an apparatus for determining a position of the movable object from the field of sports.

More details and aspects of the apparatus 310 and the movable object 320 are described above in connection with one or more further embodiments (e.g. FIGS. 1, 4 and 5). The apparatus 310 and also the movable object 320 may include one or several optional features according to one or more of the further embodiments.

In the following, in FIGS. 4 and 5, two exemplary application scenarios for the proposed position determination of movable objects are described in more detail. It is obvious that the proposed position determination of movable objects is not restricted to exactly the described application scenarios but that the position of any movable objects which may develop and/or generate a magnetic response field as a reaction to an electromagnetic exciter field may be determined.

FIG. 4 shows a system 400 for determining a location of access into a rack. In logistics it may be required, for example, to know and/or determine the location of access of a picker into a rack. Thus, it may be controlled whether the picker has taken goods from the correct rack shelf and/or into what rack shelf if has placed goods. The system 400 may enable this.

The picker may here, for example, wear a passive coil system 420 around his wrist. The coil system 420 may for example be arranged in an accessory like a wristband or a watch. The coil system 420 is configured here to develop or generate a magnetic response field as a reaction to an electromagnetic exciter field. The coil system 420 is thus an example for a movable object described generally above.

The coil system 420 to be localized may, for example, consist of three equally shaped, orthogonally mounted individual coils, one single randomly shaped coil or also three randomly shaped orthogonal coils. The coils may be tuned resonant to one single frequency. Alternatively, also any coil may be tuned to a different frequency.

The system 400 further includes an apparatus for determining a location of access into the rack according to the above-mentioned principles. As indicated in FIG. 4, the apparatus includes an exciter module to generate the electromagnetic exciter field. The electromagnetic exciter field is configured here to excite the coil system 420 to develop (generate) the magnetic response field. To generate the primary alternating magnetic field required here (i.e. the electromagnetic exciter field), the exciter module is configured as an exciter coil 411 attached around the rack.

By the primary alternating magnetic field (i.e. the electromagnetic exciter field) a current is induced in the coil of the coil system 420. Thus, the coil generates a secondary magnetic field (i.e. a magnetic response field).

The secondary magnetic field generated by current in the coil system is measured by a measurement module at a plurality of predetermined measuring positions to determine a plurality of measurement values for the secondary magnetic field. In this respect, the measurement module may comprise several frame antennas (receive antennas) 412-1, 412-2, 412-3, 412-4 arranged around the rack. The secondary magnetic field developed by the current in the coil system is thus measured by the frame antennas (receive antennas) 412-1, 412-2, 412-3, 412-4 arranged around the rack.

With industrially manufactured standard tube racks the receive antennas 412-1, 412-2, 412-3, 412-4 may be introduced into the tube structure. The tubes may here consist of suitable materials which enable at least partially penetrating a magnetic field. Thus, the user may mount the rack randomly and then afterwards indicate in e.g. a table generation software where the antennas are located and how big the rack is. The tube systems may in this respect be set up e.g. modularly and comprise terminals for the antennas.

It will be appreciated that the number of receive antennas is not restricted to the four antennas illustrated in FIG. 4. Rather, any number of antennas may be used. Based on a desired dimension or a desired accuracy of the position of the location of access to be determined, the number of receive antennas may be selected. Likewise, the number of receive antennas may be scaled to the size of the rack.

From the measurement values of the receive antennas now an evaluation module (not illustrated) may determine the location of access into the rack (i.e. the position of the coil system) according to the above indicated principles based on a comparison of the plurality of measurement values with reference measurement values to each of which a position of the coil system 420 is allocated.

Based on the determination of the reference measurement values by a simulation, both a time requirement and also a complexity for generating the reference measurement values may be reduced. In particular, a reaction to changes in the environment and/or the coil system 420 is possible fast and with little effort by updating the reference measurement values by means of an adapted simulation. Complex measurements for determining the reference measurement values may be avoided.

The system 400 thus represents an inductive solution for the localization of the location of access of a picker into a rack shelf.

The system 400 detects what shelves the picker accesses. This may also be given in case of a changing rack shelf configuration and a changing rack structure. Thus, e.g. the antennas 412-1, 412-2, 412-3, 412-4 for measuring the secondary magnetic field and the coil 411 for generating the primary field may be geometrically displaced by the user and attached to other locations if necessary. The accurate localization may here be guaranteed by updating the reference measurement values by means of an adapted simulation. Using passive coils may further enable saving a mobile current supply for the object to be localized.

FIG. 5 shows an apparatus for determining a position of an ice-hockey puck 520. The apparatus may e.g. be used to determine whether the puck 520 is in a goal 500, i.e. has crossed a goal line 550.

The apparatus includes an exciter module 511 configured to generate an electromagnetic exciter field 530. The electromagnetic exciter field 530 is configured to excite the puck 320 to develop (generate) the magnetic response field 540. The exciter module 511 may for example generate an electromagnetic exciter field according to the previously described principles. For example, the exciter module 511 may generate an alternating magnetic field. As indicated in FIG. 5, the exciter module 511 may for example be arranged in or at a goal post and/or a crossbar 501 of the goal 500. For example, the exciter module 511 may include one or several conductor loops, one or several coils or one or several coil systems arranged on or at the goal post and/or the crossbar 501 of the goal 500.

The puck 520 which may basically consist of hard rubber and comprise a disk shape is configured to develop and/or generate the magnetic response field 540 as a reaction to the electromagnetic exciter field 530. In this respect, the puck 520 may for example comprise one or several coils (not illustrated) or also one or several coil systems (not illustrated). For example, the coil or the coil systems may be configured according to the above described principles.

Further, the apparatus includes a measurement module configured to determine a plurality of measurement values for the magnetic response field 540 by measuring the magnetic response field 540 at a plurality of predetermined measuring positions. In the example shown in FIG. 5, the measurement module comprises a plurality of measurement sub-modules 512-1, 512-2, 512-3 arranged at the plurality of predetermined measurement positions. The measurement sub-modules 512-1, 512-2, 512-3 may for example be receive antennas measuring the magnetic response field 540. As indicated in FIG. 5, the plurality of measurement positions may for example be arranged in or at a goal post and/or a crossbar 501 of the goal 500. Thus, e.g. several receive antennas may be arranged on or at a goal post and/or a crossbar 501 of the goal 500. Alternatively, the measurement sub-modules 512-1, 512-2, 512-3 may be located below the goal 500 (e.g. in or below the ice surface). It will be appreciated that the number of receive antennas is not restricted to the three antennas illustrated in FIG. 5. Rather, any number of antennas (i.e. measurement sub-modules) may be used. Based on a desired dimension or a desired accuracy of the position of the puck 520 to be determined, the number of receive antennas (i.e. measurement modules) may be selected.

The goal post and/or a crossbar 501 of the goal 500 may here at least partially consist of suitable materials which at least partially enable penetrating a magnetic field.

The apparatus further includes an evaluation module 513 configured to determine the position of the puck 520 based on a comparison of the plurality of measurement values with reference measurement values. Here, one position of the movable object 520 is allocated to each of the reference measurement values. The reference measurement values are each determined by a simulation. As indicated in FIG. 5, the evaluation module 513 may for example be arranged in or at a goal post and/or a crossbar 501 of the goal 500 and pass on the result of the position determination to a further entity e.g. by radio technology. Alternatively, the evaluation module 513 may also be located outside the goal or the ice-hockey field. Accordingly, the plurality of measurement values may for example be transferred via radio technology from the measurement module to the evaluation module and evaluated there.

The apparatus may enable a localization of the puck 520 in real time. Based on the determination of the reference measurement values by a simulation, both a time requirement and also a complexity for generating the reference measurement values may be reduced. Complex measurements for determining the reference measurement values may be avoided.

In order to determine whether the puck 520 is in the goal 500, i.e. has crossed the goal line 550, now for example the just determined position of the puck 520 may be compared to a position of the goal line 550.

More details and aspects of the puck 520 and the apparatus for determining a position of the puck are described above in connection with one or more further embodiments (e.g. FIGS. 1 and 3). The puck 520 and also the apparatus for determining a position of the puck may include one or several optional features according to one or more of the further embodiments.

In context with FIG. 5 as an example the determination of a position of a puck in an ice-hockey game was described. It may be understood, however, that the described methods are not restricted to this. For example, according to the above principles, also the position of one or more ice-hockey players or one or more pieces of equipment of one or more ice-hockey players may be determined. In this respect, the one or more ice-hockey players and/or the one or more pieces of equipment may be provided with a component (element, device) which may develop and/or generate a magnetic response field as a reaction to an electromagnetic exciter field. For example, one or more coils or one or more coil systems may be attached to a body of an ice-hockey player or to a piece of equipment of an ice-hockey player. This way, e.g. also a goalmouth offside of an ice-hockey player may be determined.

It is obvious that determining whether the puck 520 is in the goal 500 is only an example for determining a passage of a movable object through a plane of interest. Generally speaking, according to the above-mentioned principles, the position of a movable object may be determined and compared to the position of a plane of interest.

It may be understood, however, that the described methods are not restricted to being applied in ice-hockey. For example, according to the above-mentioned principles, also the position of any athlete, any piece of sport equipment and/or any piece of equipment may be determined. Reference is made here merely exemplarily to determining a position of the game ball in football, in basketball, in handball, in baseball, in American football, in volleyball, in beach volleyball, in beach soccer, in water polo, in tennis, in table tennis, in street hockey, in hockey, in lacrosse, in badminton, in first ball, in softball, in cricket, in shot putting or any other ball sports game. Of course, in the aforementioned types of sports also the position of one or more players and/or one or more pieces of equipment may be determined according to the aforementioned principles. This may support a referee and/or a game master leading the game. For example, using a position determination according to the above presented principles a referee may be supported in the decision, whether a goal was shot or not, or in the decision, whether a player is in a certain area of the field he is not allowed in (e.g. offside in football or ice-hockey).

The position determination according to the above principles is not restricted to ball sports, however. The position of any athlete, any piece of sports equipment and/or any piece of equipment may be determined.

As indicated above, position determination according to the above principles may e.g. also be used when generating virtual realities to detect a position, an orientation and/or a movement of a user in the real environment and consider same in the representation of the virtual reality. For example, according to the above principles also a position, an orientation and/or a movement of an object held and/or carried by a user may be detected and be considered in the representation of the virtual reality.

Position determination according to the above presented principles may basically be used for the determination of a position of an object in any application scenario.

The features disclosed in the above description, the enclosed claims and the enclosed Figures may both individually and in any combination be of importance and implemented for realizing an embodiment in their various forms.

Although some aspects have been described in connection with an apparatus, it is clear that these aspects also illustrate a description of the corresponding method, where a block or a device of an apparatus is also to be understood as a method step or a feature of a method step. Analogously, aspects described in the context of or as a method step also represent a description of a corresponding block or detail or feature of a corresponding apparatus.

Depending on certain implementation requirements, embodiments of the invention or aspects thereof can be implemented in hardware or in software. The implementation can be performed using a digital storage medium, for example a floppy disk, a DVD, a Blue-Ray, a CD, a ROM, a PROM, an EPROM, an EEPROM or a FLASH memory, a hard disc or another magnetic or optical memory having electronically readable control signals stored thereon, which cooperate or are capable of cooperating with a programmable hardware component such that the respective method is performed.

A module or programmable hardware component may be formed by a processor, a CPU, a GPU, a computer, a computer system, an ASIC, an IC, a SoC, a programmable logics element or an FPGA.

Therefore, the digital storage medium may be machine or computer readable. Some embodiments include also a data carrier comprising electronically readable control signals which are capable of cooperating with a programmable computer system or a programmable hardware component such that one of the methods described herein is performed. One embodiment is thus a data carrier (or a digital storage medium or a computer readable medium) on which the program for executing one of the methods described herein is stored.

Generally speaking, embodiments of the present invention or aspects thereof may be implemented as a program, firmware, a computer program or a computer program product having a program code or as data, wherein the program code or the data is effective to execute one of the methods or aspects thereof when the program is executed on a processor, or a programmable hardware component. The program code or the data may, for example, also be stored on a machine-readable carrier or data carrier. The program code or the data may among others be present as a source code, machine code or byte code or any other intermediate code.

A further embodiment is a data stream, a signal sequence or a sequence of signals which may represent the program for executing one of the methods or aspects thereof described herein. The data stream, the signal sequence or the sequence of signals may for example be configured so as to be transferred via a data communication connection, for example via the internet or another network. Embodiments thus also are signal sequences representing data suitable for being transferred via a network or a data communication connection, the data representing the program.

A program according to one embodiment may implement one of the methods or aspects thereof during its execution, for example by reading out memory locations or writing one or several data into the same, whereby possibly switching processes or other processes in transistor structures, in amplifier structures or in other electrical, optical, magnetical or other members operating according to another functional principle are caused. Accordingly, by reading out a memory location, data, values, sensor values or other information is determined, detected or measured by a program. By reading out one or several memory locations, a program may detect, determine or measure magnitudes, values, measured quantities and other information and, by writing into one or several memory locations, cause, trigger or execute an action and control other devices, machines and components.

The above described embodiments are merely an illustration of the principles of the present invention. It is understood that modifications and variations of the arrangements and the details described herein will be apparent to others skilled in the art. It is the intent, therefore, that this invention is limited only by the scope of the impending patent claims and not by the specific details presented by way of description and explanation of the embodiments herein.

The invention claimed is:

1. A method for determining a position of a movable object, comprising:
   generating an electromagnetic exciter field, the electromagnetic exciter field being configured to excite the movable object to develop a magnetic response field;
   determining a plurality of measurement values for the magnetic response field by measuring the magnetic response field at a plurality of predetermined measuring positions; and
   determining the position of the movable object based on a comparison of the plurality of measurement values with a plurality of reference values, wherein each reference value is assigned to a reference position of the movable object, and wherein each reference value is determined by a simulation.

2. The method according to claim 1, wherein determining the position of the movable object further includes:
   determining a similarity of one of the plurality of measurement values to one of the reference values according to a predetermined metric.

3. The method according to claim 2, wherein determining the position of the movable object further includes:
   determining the position of the movable object to be the reference position which is associated with the reference value which has a greatest similarity to the plurality of measurement values according to the metric.

4. The method according to claim 2, wherein determining the position of the movable object further includes:
   determining a number of the reference values which have a greatest similarity to the plurality of measurement values according to the metric; and
   determining the position of the movable object to be a weighted average of the reference positions assigned to the number of the reference values.

5. The method according to claim 4, wherein weighting a position of the movable object allocated to one of the number of reference values is based on the similarity of the one of the number of reference values to the plurality of measurement values.

6. The method according to claim 1, wherein determining the position of the movable object further includes:
   filtering a candidate for the position of the movable object using a Kalman filter, wherein the Kalman filter is based on a movement model for the movable object.

7. The method according to claim 6, wherein filtering the candidate for the position of the movable object further includes:
   determining, using the movement model, a predicted position of the movable object based on previously determined positions of the movable object; and
   comparing the predicted position of the movable object to the candidate for the position of the movable object.

8. The method according to claim 7, wherein filtering the candidate for the position of the movable object further includes:
   discarding the candidate for the position of the movable object if a difference between the predicted position of the movable object and the candidate for the position of the movable object is greater than a threshold value.

9. The method according to claim 1, wherein an orientation of the movable object is further allocated to each of the reference values.

10. The method according to claim 1, wherein the magnetic response field is generated by three orthogonal coils, and wherein the coils are configured, in case of an identical orientation relative to the electromagnetic exciter field, to generate substantially equal magnetic response sub-fields.

11. The method according to claim 1, wherein the magnetic response field is generated by three orthogonal coils, and wherein the coils are configured, in case of an identical orientation relative to the electromagnetic exciter field, to generate distinguishable magnetic response sub-fields.

12. The method according to claim 11, wherein the three coils exhibit different resonance frequencies and/or the respective magnetic response sub-fields of the three coils are modulated with different code sequences.

13. The method according to claim 1, wherein determining the plurality of measurement values for the magnetic response field further comprises:
   normalizing the measurement value determined for one of the plurality of predetermined measurement positions based on the sum of the measurement values determined for all of the plurality of predetermined measurement positions.

14. The method according to claim 13, wherein the plurality of predetermined measurement positions is located outside a plane in which generating the electromagnetic exciter field takes place.

15. The method according to claim 1, wherein each of the reference values is determined by the simulation based on:
   a geometry of an exciter system used for generating the electromagnetic exciter field,
   a geometry of a response system used for emitting the magnetic response field,
   a geometry of a measurement system used for measuring the magnetic response field, and an impedance of the response system.

16. The method according to claim 15, further including entering the geometries of the exciter system, the response system, and the measurement system in simulation software to determine the reference values.

17. The method according to claim 1, the method further comprising:
   determining, on the basis of a frequency sweep of the electromagnetic exciter field, that the movable object is not located within a predetermined radius around a location of generation of the electromagnetic exciter field;
   determining a plurality of auxiliary measurement values at the plurality of predetermined measurement positions, wherein the plurality of auxiliary measurement values represent a magnetic response field of an interference object at the plurality of predetermined measurement positions;
   estimating a position of the interference object based on a comparison of the plurality of auxiliary measurement values to the reference values; and
   determining, taking into account the interference object, an updated reference value for a position which has a predetermined maximum distance to the position of the interference object.

18. The method according to claim 1, the method further comprising:
    determining a plurality of second measurement values at the plurality of predetermined measurement positions, wherein the plurality of second measurement values represent a second magnetic response field of a second movable object at the plurality of predetermined measurement positions, and wherein a first resonance frequency of a first response system of the movable object used for emitting the magnetic response field is different from a second resonance frequency of a second response system of the second movable object used for emitting the second magnetic response field; and
    determining the position of the second movable object based on a comparison of the plurality of second measurement values with the reference values.

19. The method according to claim 1, the method further comprising:
    determining a plurality of second measurement values at the plurality of predetermined measurement positions, wherein the plurality of second measurement values represent a second magnetic response field of a second movable object at the plurality of predetermined measurement positions, and wherein the magnetic response field and the second magnetic response field are modulated with codes which are orthogonal to each other; and
    determining the position of the second movable object based on a comparison of the plurality of second measurement values with the reference values.

20. An apparatus for determining a position of a movable object, comprising:
    an exciter module configured to generate an electromagnetic exciter field, the electromagnetic exciter field being configured to excite the movable object to develop a magnetic response field;
    a measurement module configured to determine a plurality of measurement values for the magnetic response field by measuring the magnetic response field at a plurality of predetermined measuring positions; and
    an evaluation module configured to determine the position of the movable object based on a comparison of the plurality of measurement values with reference values, wherein each reference value is assigned to a reference position of the movable object, and wherein the reference values are each determined by a simulation.

21. A system, comprising:
    at least one movable object configured to develop a magnetic response field as a reaction to an electromagnetic exciter field; and
    an apparatus for determining a position of a movable object according to claim 20.

* * * * *